US010589582B2

(12) United States Patent
Westervelt

(10) Patent No.: US 10,589,582 B2
(45) Date of Patent: Mar. 17, 2020

(54) PIVOTAL TOW BAR ASSEMBLY

(71) Applicant: N.S.A. RV PRODUCTS, INC., Iola, KS (US)

(72) Inventor: Tod Westervelt, Gas, KS (US)

( * ) Notice: Subject to any disclaimer, the term of this patent is extended or adjusted under 35 U.S.C. 154(b) by 241 days.

(21) Appl. No.: 15/880,313

(22) Filed: Jan. 25, 2018

(65) Prior Publication Data

US 2019/0225036 A1   Jul. 25, 2019

(51) Int. Cl.
| | |
|---|---|
| *B60D 1/54* | (2006.01) |
| *B60D 1/167* | (2006.01) |
| *B60D 1/14* | (2006.01) |
| *B60D 1/24* | (2006.01) |
| *B60D 1/56* | (2006.01) |
| *B60T 7/20* | (2006.01) |
| *B60T 13/08* | (2006.01) |

(52) U.S. Cl.
CPC .......... *B60D 1/1675* (2013.01); *B60D 1/143* (2013.01); *B60D 1/242* (2013.01); *B60D 1/54* (2013.01); *B60D 1/56* (2013.01); *B60D 2001/546* (2013.01); *B60D 2001/548* (2013.01); *B60T 7/20* (2013.01); *B60T 13/08* (2013.01)

(58) Field of Classification Search
CPC ........ B60D 1/675; B60D 1/143; B60D 1/242; B60D 1/54; B60D 1/56; B60D 2001/546; B60D 2001/548; B60T 7/20; B60T 13/08
See application file for complete search history.

(56) References Cited

U.S. PATENT DOCUMENTS

| | | | | |
|---|---|---|---|---|
| 1,557,841 | A * | 10/1925 | Holmes | B60D 1/02 |
| | | | | 280/494 |
| 2,871,030 | A | 1/1959 | Hollis | |
| 4,711,461 | A * | 12/1987 | Fromberg | B60D 1/02 |
| | | | | 280/494 |
| 5,647,604 | A * | 7/1997 | Russell | B60D 1/00 |
| | | | | 280/492 |
| 5,765,851 | A * | 6/1998 | Parent | B60D 1/143 |
| | | | | 280/491.1 |
| 5,873,595 | A | 2/1999 | Hinte | |
| 5,957,477 | A | 9/1999 | Ensz et al. | |
| 6,264,228 | B1 | 7/2001 | Westervelt | |
| 6,502,847 | B1 | 1/2003 | Greaves | |
| 6,612,604 | B2 | 9/2003 | Greaves | |
| 6,619,686 | B1 * | 9/2003 | Klar | B60D 1/54 |
| | | | | 280/491.3 |
| 6,764,092 | B1 | 7/2004 | Greaves, Jr. | |
| 6,926,125 | B1 | 8/2005 | Westervelt | |
| 7,125,031 | B1 | 10/2006 | Schoonover | |
| 7,390,007 | B2 | 6/2008 | Helms et al. | |

(Continued)

*Primary Examiner* — Tony H Winner
*Assistant Examiner* — Marlon A Arce
(74) *Attorney, Agent, or Firm* — Dowell & Dowell, P.C.

(57) ABSTRACT

A tow bar assembly for use in connecting a towing vehicle to a towed vehicle. The tow bar assembly includes a drawbar and a housing assembly capable of being configured with a supplemental braking system. A connector secures the housing to a tow hitch member, such that two separate, non-planar perpendicular axes of pivotal rotation are created. The tow hitch assembly includes at least one arm with an inner and outer portion, wherein the inner portion rotates about a central axis relative to the inner portion within the outer portion. A fourth pivotal axis is created by a connection of mounting brackets to the tow hitch member.

19 Claims, 6 Drawing Sheets

(56) References Cited

U.S. PATENT DOCUMENTS

| | | | |
|---|---|---|---|
| 8,439,388 B1 | 5/2013 | Westervelt | |
| D693,746 S * | 11/2013 | Roeber | D12/162 |
| 9,283,822 B1 * | 3/2016 | Krapf | B60D 1/24 |
| 2004/0061309 A1 | 4/2004 | Shoffner | |
| 2010/0225092 A1 * | 9/2010 | Hudson | B60D 1/00 |
| | | | 280/494 |
| 2013/0140792 A1 * | 6/2013 | Harkcom | B60D 1/075 |
| | | | 280/494 |

* cited by examiner

PIVOTAL TOW BAR ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO SEQUENCE LISTING

Not Applicable.

STATEMENT REGARDING PRIOR DISCLOSURES BY THE INVENTOR OR A JOINT INVENTOR

The inventor has made no prior disclosures regarding the present invention. The inventor and Applicant have disclosed other inventions, notably as published in U.S. Pat. Nos. 6,264,228, 6,926,125, and 8,439,388, which include a Hitch Assembly For Activating a Towed Vehicle's Brakes, Premature Activation Stop For Towed Vehicle Cable Braking Systems, and a Universally Pivotal Tow Bar Assembly.

BACKGROUND OF THE INVENTION

The present invention pertains to the field of land vehicles, specifically the towing of land motor vehicles.

This application is directed to a tow bar assembly for use in towing a motor vehicle from a towing vehicle and more particularly to a tow bar assembly that establishes universal movement between a towing vehicle, such as a motor home, recreational vehicle (hereinafter "RV"), or truck, and a towed vehicle, such as a car. The tow bar assembly is designed to be connected to a conventional hitch receiver of the towing vehicle and may incorporate an adjustable double arm attachment for attachment to base plates secured to the towed vehicle.

Numerous tow bar assemblies have been created for facilitating the connection of a towing vehicle to a towed vehicle. In particular, in the field of motor homes or RVs, it is often desired to pull a smaller vehicle from the motor home so that the smaller and more fuel efficient vehicle may be used for local travel after arriving at a primary destination. With conventional towing devices, a hitch receiver is mounted to the towing vehicle, such as a motor home, and a storable hitch bar assembly is used to connect a vehicle to be towed to the hitch receiver.

To facilitate the storing of conventional towing devices, components of the tow bar assemblies were designed to be readily folded for compact storage when not in use. Further, to permit relative movement between a towing vehicle and a towed vehicle while establishing a safe and balanced connection between the two vehicles, many conventional tow bar assemblies have a pair of arms with outer free ends that are designed to be clamped to the towed vehicle in such a manner that the connection is created at a pair of spaced points relative to the towed vehicle so that the stresses created on the frame of the towed vehicle are distributed on opposite sides of a central elongated axis of the vehicle. The arms are conventionally pivotally connected to a bracket so as to be movable in a horizontal plane so that the arms may be spread apart relative to one another when being mounted to a towed vehicle and may be selectively pivoted together for compact storage.

Early tow bar assemblies were designed such that there was limited motion established between a towing vehicle and a towed vehicle. Without allowing for relative motion or movement between two vehicles, tremendous stresses are created on hitch assemblies or tow bar assemblies. Such stresses often lead to failures of the tow bar assemblies. When a towed vehicle accidentally separates from a towing vehicle, the results are not only the possible damage or destruction of at least the towed vehicle but also possible injury or death to others in the area of the vehicles. Apart from the possible results of damage to property or injury to people, if the components of a tow bar assembly are not relatively movable, it is very difficult to establish a proper towing connection between two vehicles, especially if they are not initially properly aligned with one another.

To reduce the risks of possible damage to property or injury to people, many current tow bar assemblies have been designed to permit relative motion of the components of the tow bar assemblies to be established relative to and between a towing vehicle and a towed vehicle. Such more recent tow bar assemblies have also been designed to be adjustable in two or more planes so as to facilitate the connection between a towing vehicle and a towed vehicle. Often, vehicles are not perfectly aligned vertically, horizontally, or laterally relative to one another when being connected to a tow bar assembly. However, if a tow bar assembly is adjustable in three or more planes, a proper connection may be established between a towing vehicle and a towed vehicle regardless of their relative positions with respect to one another.

Current conventional tow bar assemblies which create universal adjustment between two vehicles, are defined by three horizontally spaced pivot axes, one axis allowing motion within a horizontal plane, another allowing motion in a vertical plane and the last allowing rotational motion, typically about an elongated axis of the hitch receiver of the towing vehicle. In the past, the spacing of the three points of pivotal motion not only increased the cost of manufacture but also increased the length of the overall tow bar assembly. Typically, as the tow bar assembly becomes more elongated, it becomes less rigid and the resistance to stress along the length of the tow bar assembly is reduced. As a result, the trend in modern tow bar design has been to congregate the three points of pivotal motion to one location on the tow bar, and if possible align the intersection of the axes on a single plain.

One of the problems associated with modern tow bar assemblies that permit generally universal adjustment of one or more towing arms relative to a towed vehicles is that the components of such tow bar assemblies are often complex. Conventional designs attempt to space the three points of pivotal motion as close as possible on tow bar assemblies for the aforementioned reasons. Such tow bar assemblies therefore include relatively complex structures to accomplish the desired function. As the structures become more complex, they thus become more expensive to manufacture and more difficult to install and maintain.

In view of the foregoing, there is a need to develop a towing device that is universally adjustable to both facilitate the initial connection of a towing vehicle to a towed vehicle and thereafter to permit relative movement, in at least three planes, between the two vehicles when they are connected with one another. By allowing relative movement in three planes between a towing vehicle and a towed vehicle, most of the load on the towing device is directed along the length thereof which results in a balanced force being directed to the towing vehicle making handling of the towing vehicle much easier and safer. Further, there is a need to simplify the design of current two bar assemblies to reduce the cost of manufacturing, while simultaneously maintaining the structural integrity and safety of the tow bar assembly. The invention disclosed below presents a tow bar assembly that purposely spreads the pivot points along the length of the tow bar, against past teachings of tow bar assembly, without sacrificing structural integrity or functionality. The machines described herein solve the issue of rising manufacturing costs and safety concerns with simpler components and improved design.

BRIEF SUMMARY OF THE INVENTION

Machines, assemblies, and apparatuses are described for attaching a towing vehicle to a towed vehicle via a tow bar assembly. Several preferred embodiments of the tow bar assembly are provided below. These embodiments and more are shown and discussed in greater detail in the drawings and detailed description sections.

Accordingly, in a first preferred embodiment, there is a tow bar assembly comprising:
  a drawbar that is receivable within a receiver of a towing vehicle;
  a housing having oppositely oriented first and second ends, wherein the first end of the housing connects the housing to the drawbar and the second end of the housing is defined by a pair of opposing generally parallel and spaced flanges;
  a connector having oppositely oriented first and second ends,
    the first end of the connector oriented between the flanges of the second end of the housing and connected to the second end of the housing via a first pivot member such that the connector is pivotal with the housing along a first pivot axis,
    the second end of the connector defined by a pair of opposing generally parallel and spaced flanges adapted to receive a second pivot member;
  a tow hitch member having at least one arm connected to the second pivot member and extending from the second pivot member to a mounting bracket for connection to the towed vehicle and such that the connector and tow hitch member are pivotal about a second pivot axis, whereby the tow bar assembly permits universal pivoting motion between the towing vehicle and the towed vehicle.

A second embodiment of the tow bar assembly is taught, comprising: a drawbar that is receivable within a receiver of a towing vehicle;
  a housing having oppositely oriented first and second ends, wherein the first end of the housing connects the housing to the drawbar and the second end of the housing is defined by a pair of opposing generally parallel and spaced flanges;
  a connector having oppositely oriented first and second ends,
    the first end of the connector oriented between the flanges of the second end of the housing and connected to the second end of the housing via a first pivot member such that the connector is pivotal with the housing along a first pivot axis,
    the second end of the connector defined by a pair of opposing generally parallel and spaced flanges adapted to receive a second pivot member;
  a tow hitch member having at least one arm connected to the second pivot member and extending from the second pivot member to a mounting bracket for connection to the towed vehicle and such that the connector and tow hitch member are pivotal about a second pivot axis, whereby the tow bar assembly permits universal pivoting motion between the towing vehicle and the towed vehicle, and
  wherein the tow hitch member includes a pair of arms pivotally mounted to the second end of the connector so as to be pivotal about the second axis, and each arm has an inner portion that is selectively extendable and retractable relative to an outer portion thereof, and wherein each arm of the pair of arms is pivotally attached to the mounting bracket so as to pivot about two axes that are oriented perpendicularly relative to one another.

Another embodiment of the tow bar assembly is taught, comprising:
  a drawbar that is receivable within a receiver of a towing vehicle;
  a housing having oppositely oriented first and second ends, wherein the first end of the housing connects the housing to the drawbar and the second end of the housing is defined by a pair of opposing generally parallel and spaced flanges;
  a connector having oppositely oriented first and second ends,
    the first end of the connector oriented between the flanges of the second end of the housing and connected to the second end of the housing via a first pivot member such that the connector is pivotal with the housing along a first pivot axis,
    the second end of the connector defined by a pair of opposing generally parallel and spaced flanges adapted to receive a second pivot member associated with a tow hitch member having at least one arm that extends from the second end of the connector to a mounting bracket for connection to the towed vehicle and such that the connector is pivotal relative to the tow hitch member about a third pivot axis, whereby the tow bar assembly permits universal pivoting motion between the towing vehicle and the towed vehicle; and
  a supplemental breaking system, including the drawbar, housing, an actuator lever, and a cable.

Yet another embodiment of the tow bar assembly is taught, comprising:
  a drawbar that is receivable within a receiver of a towing vehicle;
  a housing having oppositely oriented first and second ends, wherein the first end of the housing connects the housing to the drawbar and the second end of the housing is defined by a pair of opposing generally parallel and spaced flanges;
  a connector having oppositely oriented first and second ends,
    the first end of the connector oriented between the flanges of the second end of the housing and connected to the second end of the housing via a first pivot member such that the connector is pivotal with the housing along a first pivot axis, the second end of the connector defined by a pair of opposing generally parallel and spaced flanges adapted to receive a second pivot member;

a tow hitch member having at least one arm connected to the second pivot member and extending from the second pivot member to a mounting bracket for connection to the towed vehicle and such that the connector and tow hitch member are pivotal about a second pivot axis, whereby the tow bar assembly permits universal pivoting motion between the towing vehicle and the towed vehicle, and wherein the tow hitch member includes a pair of arms pivotally mounted to the second end of the connector so as to be pivotal about the second axis, and each arm has an inner portion that is selectively extendable and retractable relative to an outer portion thereof, and wherein each arm of the pair of arms is pivotally attached to the mounting bracket so as to pivot about two axes that are oriented perpendicularly relative to one another; a shock absorber mounted within the combo head;

a brake lever pivotally mounted relative to the combo head and having a first end mounted within the combo head and connected to the shock absorber, and a second end extending outwardly thereof; and a cable for connecting the second end of the brake lever to a brake pedal of the towed vehicle.

It is the primary object of the present invention to provide a universally adjustable tow bar assembly that can be easily mounted between a towing vehicle and a towed vehicle even if the two vehicles are not aligned with one another and wherein the tow bar assembly creates first, second, and third pivot axes along separate planes, with the first axis being about an elongated axis of the housing and the connector, wherein the connector is vertically pivotal in relation to the drawbar and housing about the first pivot axis. The second pivot axis is about an elongated axis of the connector and tow hitch member, wherein the tow hitch member is horizontally pivotal in relation to the connector. The third pivot axis is about an elongated axis of the arm of the tow hitch member, wherein the tow hitch member pivotally rotates about the arm in relation to the mounting bracket.

It is also an object of the present invention to provide a fourth pivot axis along yet another separate plane, wherein the mounting bracket is pivotally attached at a free end of the tow hitch member by a third pivot member.

It is another object of the invention to provide a tow bar assembly that will automatically align a towed vehicle relative to a towing vehicle regardless of any difference in the terrain over which the vehicles are passing and such that forces transmitted toward the towing vehicle from the towed vehicle will be properly aligned relative to a centerline from the front to the rear of the towing vehicle.

It is a further object of the invention to provide a tow bar assembly having tow bar arms so as to have connection devises or brackets, for securing the arms to base plates mounted to a towing vehicle, such connection devises or brackets being pivotal about at two axes to thereby facilitate attachment of the arms to the towed vehicle.

It is also an object of the invention to provide a simple assembly have very few components such that the cost of manufacturing is reduced while the strength and robustness of the assembly is maintained.

A further understanding of the structural, functional, and advantageous aspects of the disclosure can be realized by reference to the following detailed drawings and description.

BRIEF DESCRIPTION OF THE SEVERAL VIEWS OF THE DRAWINGS

A better understanding of the invention will be had with reference to the accompanying drawings wherein.

DETAILED DESCRIPTION OF THE INVENTION

Figure 6:
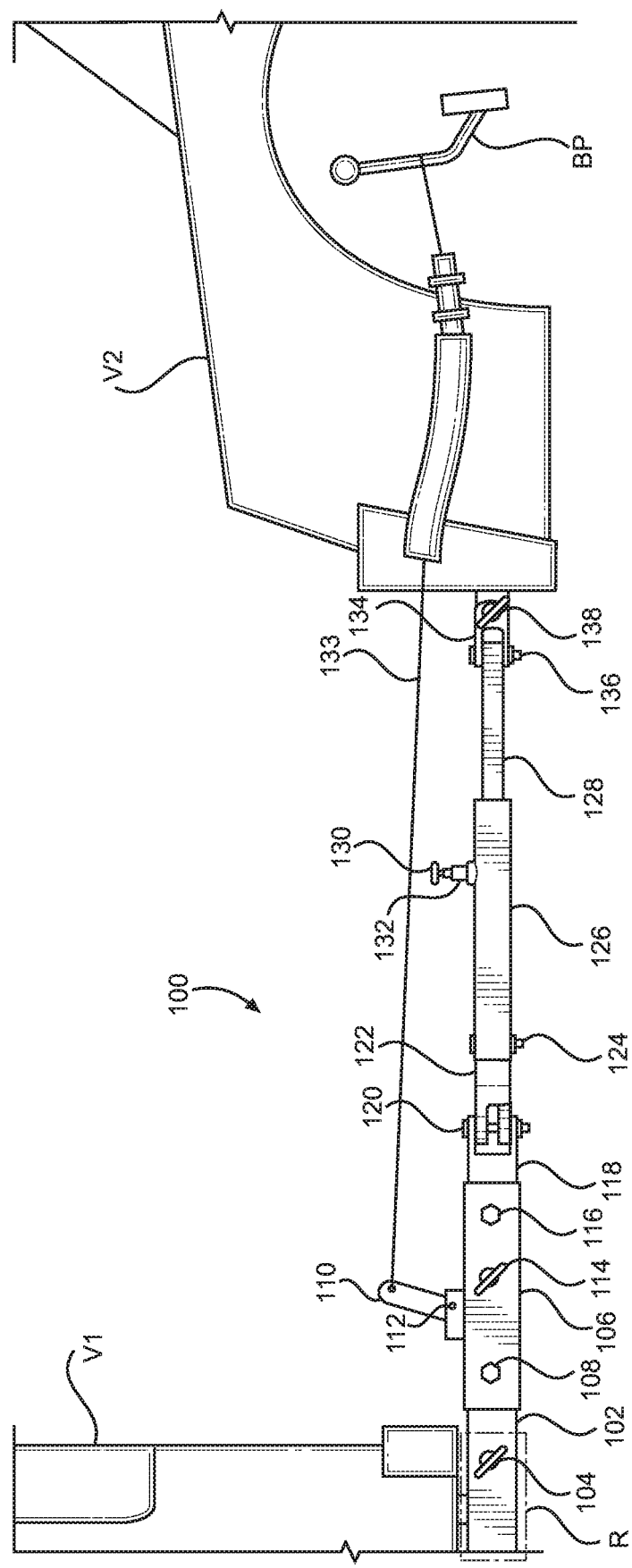
FIG. 6 is an illustrational view showing the tow bar assembly of FIG. 1 mounted between a towing vehicle and a towed vehicle, wherein a safety break or supplemental braking system is included with the tow bar assembly and installed in the towed vehicle.

With continued reference to the drawings, a tow bar assembly 100 is shown in FIG. 6 as being used to connect a towing vehicle "V1," such as a bus, motor home, or recreational vehicle, to a towed vehicle "V2," such as a car or truck. A receiver "R" is welded or otherwise connected to a rear frame member of the towing vehicle V1 and is of a size to selectively receive a drawbar 102 of the tow bar assembly 100. In preferred embodiments, the drawbar is formed of squared tubular steel such as 2"×2" steel tubing of a size to be slidably received within the receiver R with little to no lateral play of clearance there between. A locking pin 104 is used to secure the drawbar within the receiver R. A supplemental braking system is located with a housing 106, which is connected to the drawbar 102. The housing 106 slidably receives the drawbar 102 through an opening at an end opposite to a flanged opening of a second end 105, best shown in FIG. 3. Pivotally mounted on and within the drawbar 102 is a safety brake lever 110 that is connected by way of a cable 133 to a brake pedal "BP" of the towed vehicle V2. The safety brake mechanism operates in a known manner to apply brakes of the towed vehicle should the tow bar assembly between the towing vehicle V1 and towed vehicle V2 fail for any reason.

Figure 1:
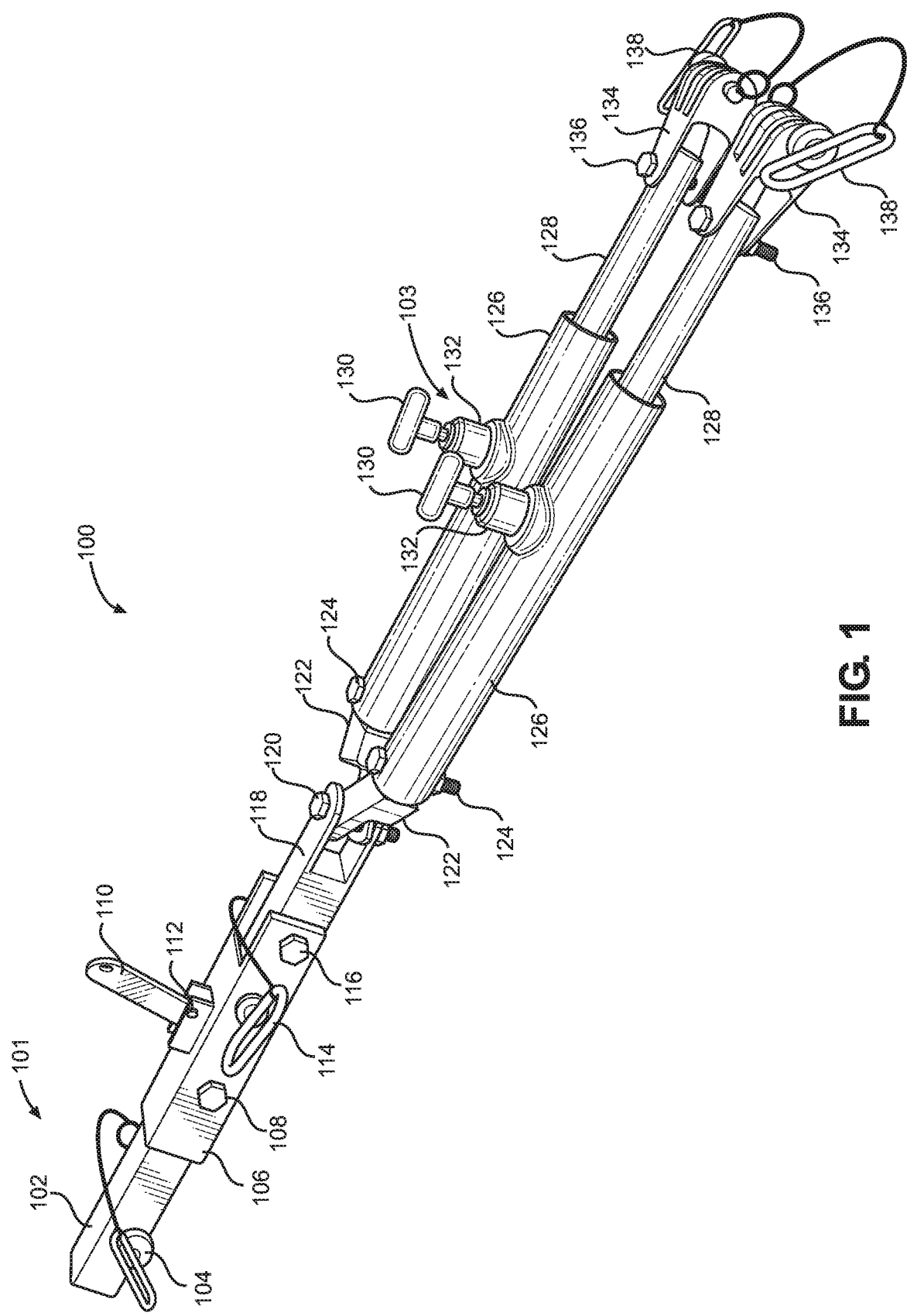
FIG. 1 is a side perspective view of a tow bar assembly of the present invention.

Referring now to FIG. 1, the tow bar assembly 100 includes several major structures, including a safety break assembly or supplemental breaking system 101, a connector 116, and a tow hitch member 103. The safety break assembly 101 connects the tow bar assembly 100 to the towing vehicle V1 and the tow hitch member 103 connects the tow bar assembly to the towed vehicle V2.

Figure 2:
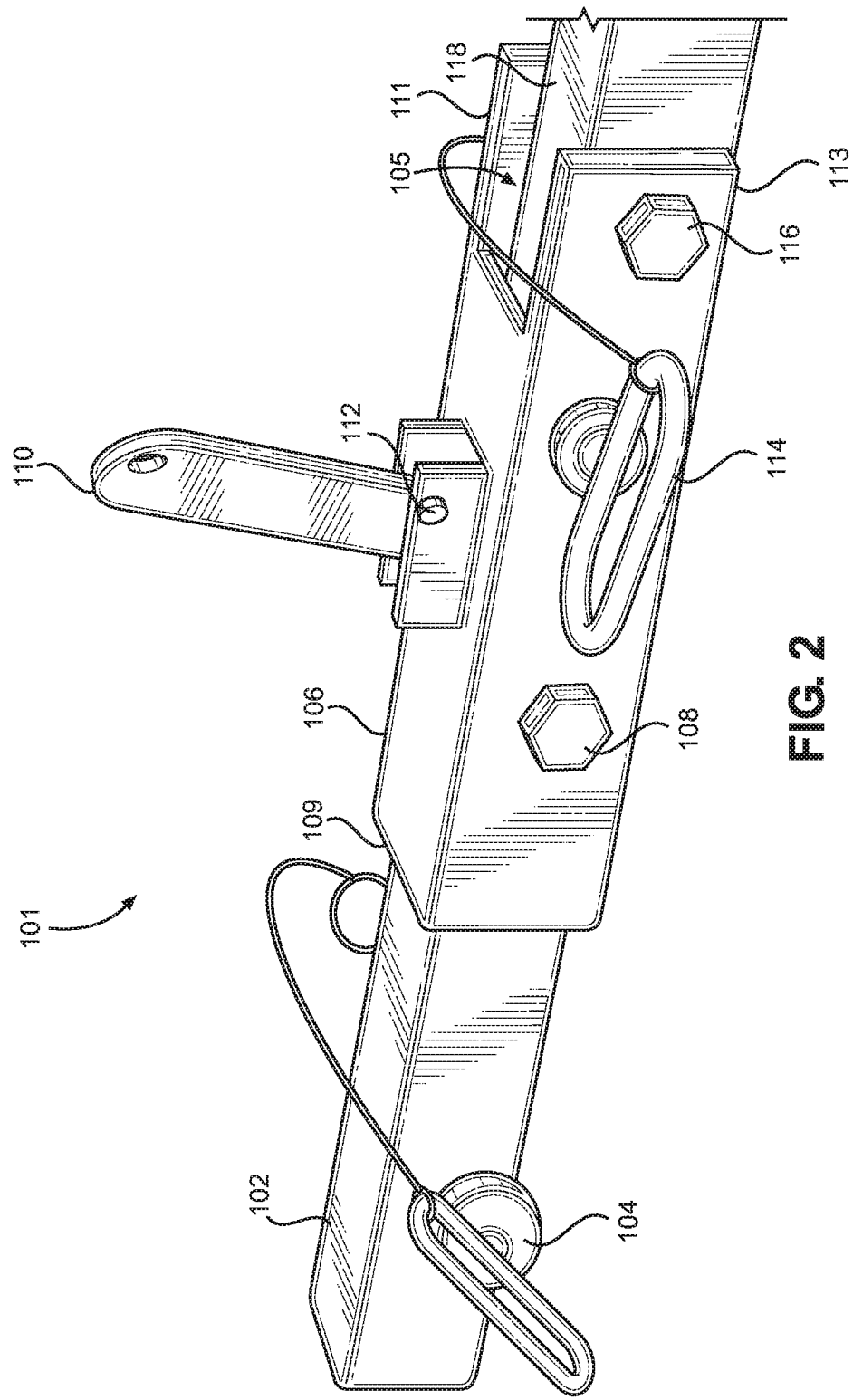
FIG. 2 is a side perspective view of a safety break assembly of the tow bar assembly shown in FIG. 1, generally including a drawbar, a housing, fastener elements, and a safety break lever.

Shown in FIG. 2, the safety break assembly 101 includes the drawbar 102, which is receivable within the receiver R of a towing vehicle. The drawbar 102 is secured within the housing 106 by a fastener 108. Locking pin 104 secures the drawbar 102 to the receiver R when the drawbar is slidably engaged with the receiver through two sets of corresponding holes on either side of both the drawbar and the receiver. Pin 114 is used in connection with a connection point, such as a bracket or plate, to secure the tow bar assembly 100 to the towing vehicle V1 when the tow bar assembly is not in use. In FIG. 1, pins 104 and 114 are modified T-pins with looped handles for easy manipulation. However, pins 104 and 114 can be any fastener suitable to secure the drawbar 102 and tow bar assembly 100, respectively.

The housing 106 is generally hollow and has an open first end 109 for receiving the drawbar 102, whereby the drawbar is secured with the housing by fastener 108, and has a second end 105 defined by the flanged opening, further defined by a pair of opposing generally parallel and spaced flanges opposite to the first end 109, the flanged opening being spaced to receive a connector 118. Housing flanges 111 and 113 of the second end 105 of the housing are oriented vertically and are opposing, generally parallel and spaced to accept the connector 118 with minimal lateral play to allow the flanges 111 and 113 to freely pivot in relation to the connector, and vice versa. The housing 106 further includes a safety brake lever 110 pivotally mounted on and within the housing and is part of a supplemental braking system that is located within the housing. The safety brake lever 110 pivots about pin 112 attached to the housing 106. As seen in FIG. 6, a cable 133 is attachable between the safety brake lever 110 and brake pedal BP of the towed vehicle V2. As the force of the towed vehicle V2 moving forward pushes and compacts the tow bar assembly 100 between the towed vehicle and towing vehicle V1, as is the case when the towing vehicle deaccelerates, the housing 106 slides over the drawbar 102. The drawbar 102 pushes on the safety brake lever 110, causing the lever and cable 133 to pull on the brake pedal BP of the towed vehicle V2 and engage the brakes of the towed vehicle. When the tow bar assembly 100 is pulled or elongated between the towing vehicle and towed vehicle, as when the towing vehicle V1 accelerates, the housing 106 slides back over the drawbar 102 in an opposite direction and allows the safety break lever 110 and brake pedal BP to resume their resting positions, disengaging the brakes of the towed vehicle V2. Fastener 108 secures the housing 106 to the drawbar 102, and in FIG. 2 is secured in a fixed position relative to the housing. Slots on either side of the drawbar 102 allow the fastener 108 to secure the drawbar and housing 106 through corresponding holes on either side of the housing and through the slots on either side of the drawbar, while still allowing the housing to slide relative to the drawbar. Alternatively, the fastener 108 could be secured in a fixed location relative to the drawbar 102 and through corresponding slots on either side of the housing 106 to allow the same sliding motion. A known spring mechanism can also be employed within the drawbar 102 and housing 106 to achieve the same function and further act as a shock absorber.

Figure 3:
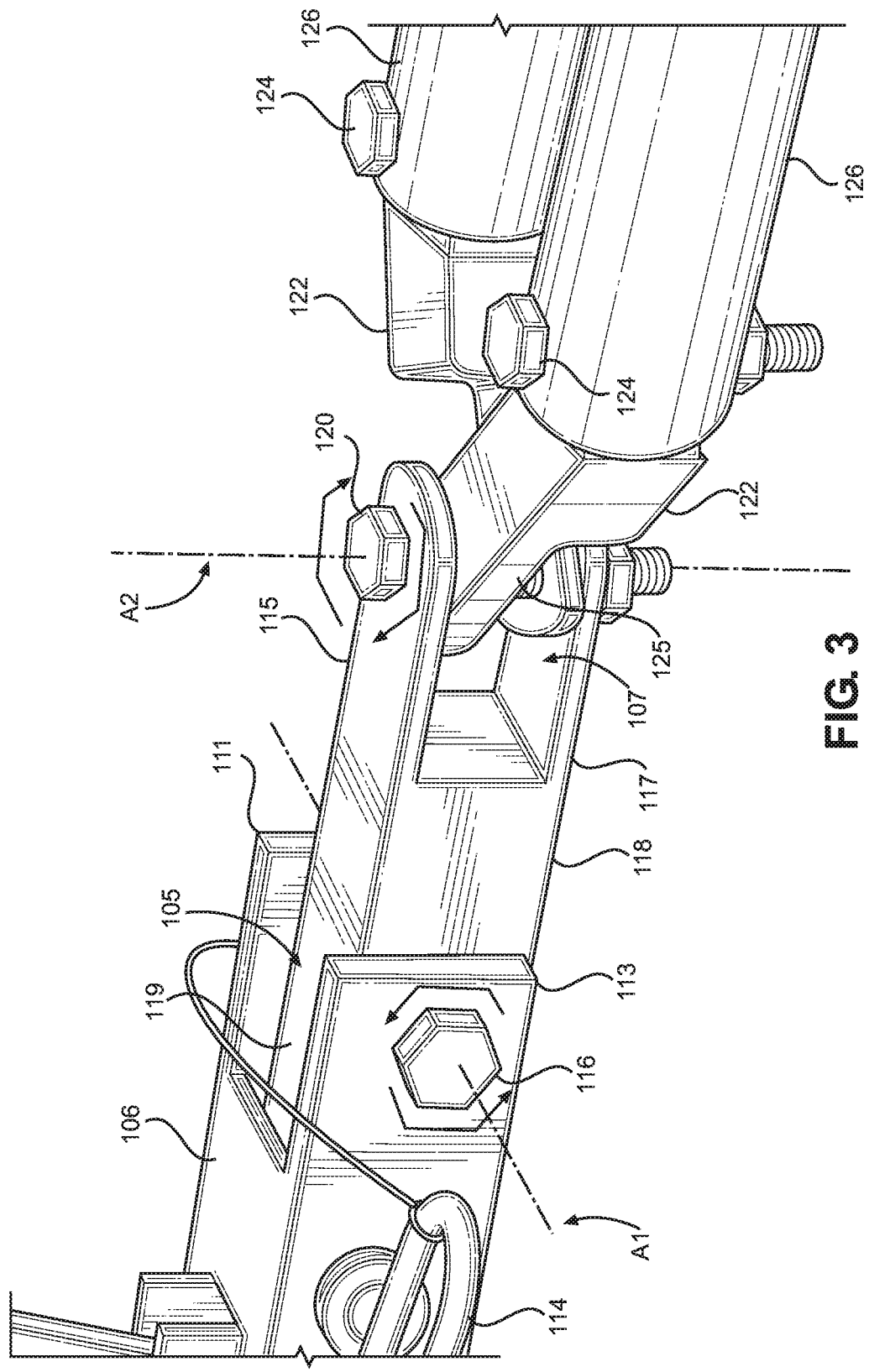
FIG. 3 is a side perspective view of a connector, housing, and a tow hitch member of the tow bar assembly shown in FIG. 1, showing two of four possible pivot axes.

As best shown in FIG. 3, the connector 118 is elongated and has oppositely oriented first and second ends, 119 and 107. The first end 119 is oriented in the flanged opening between flanges 111 and 113 of second end 105 of the housing 106 and connected via a first pivot member 116 such that the connector 118 is pivotal with the housing, and vice versa, along a first pivot axis "A1." The first pivot member 116 engages the second end 105 of the housing through corresponding holes in flanges 111 and 113 and corresponding holes in the connector first end 119. The flanged opening of the housing second end 105 is deep and wide enough to allow the connector 118 and housing 106 to freely rotate along the first pivot axis A1. The second end 107 of the connector is defined by a second flanged opening, further defined by a pair of horizontally oriented opposing generally parallel and spaced flanges 115 and 117 and opposite the connector first end 119, and is adapted to receive a second pivot member 120 associated with a tow hitch member 103. The second pivot member 120 engages the second end of the connector 118 through corresponding holes in flanges 115 and 117, and through corresponding holes in the tow hitch member 103, specifically elbows 122 of the tow hitch member in this embodiment. The flanged opening of the connector second end 107 is deep and wide enough to allow the tow hitch member 103 and connector 118 to freely rotate along a second pivot axis "A2."

The connector 118 allows the tow bar assembly 100 to pivot about itself along two generally perpendicular axes, with the first pivot axis A1 being between the housing 106 and the connector 118 about the first pivot member 116 and the second pivot axis A2 being between the connector 118 and the tow hitch member 103 about the second pivot member 120. Relating to the rotation about the first pivot axis A1, the connector 118 preferably has the freedom to rotate at least 180° vertically, 90° up or down, in relation to the housing 106, and vice versa. Relating to the rotation about the second pivot axis A2, the connector 106 preferably has the freedom to rotate at least 180° horizontally, 90° left or right, in relation to the tow hitch member 103, and vice versa.

Figure 4:
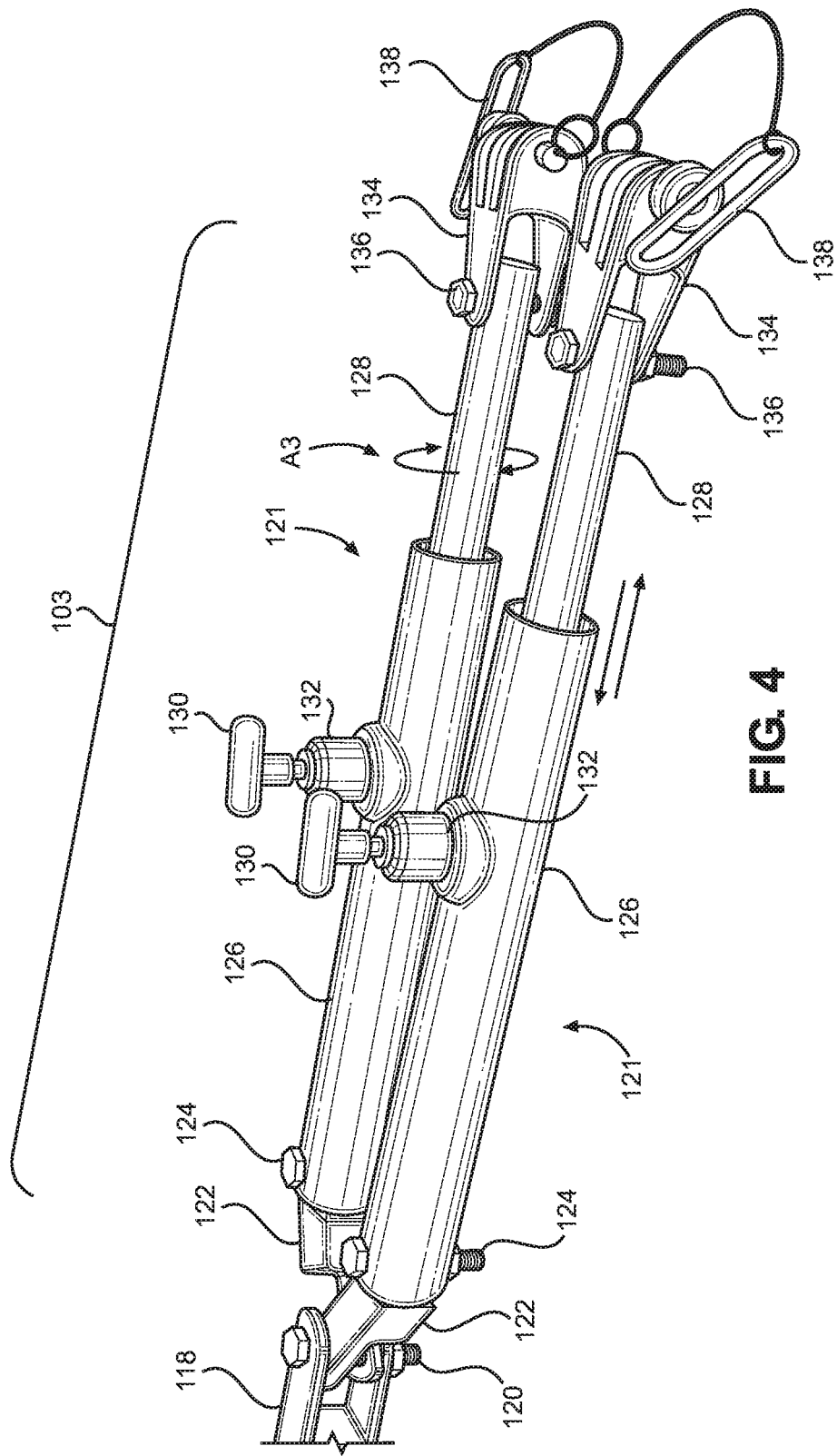
FIG. 4 is a side perspective view of a hitch member of the tow bar assembly shown in FIG. 1, specifically an embodiment of the tow hitch member including a pair of arms.

FIG. 4 demonstrates a preferred embodiment of the tow hitch member 103 of the tow bar assembly 100. In this embodiment, the tow hitch member 103 has a pair of arms 121, each arm having an inner portion 128 that is selectively telescopically extendable and retractable relative to an outer portion 126 thereof. An Elbow 122 on each arm is angled to connect each arm 121 of the tow hitch member 103 to the second pivot member 120, as previously described. Each elbow 122 allows each arm 121 to both be attached to the second pivot member 120 and be pivotal about the second pivot member in relation to the connector 118. Each elbow 122 has an opening at an end 125 attached to the second pivot member 120 corresponding with the openings in the flanges 115 and 117, such that the second pivot member engages both flanges and elbows along a single axis. An elbow fastener 124 in each arm secures each elbow 122 to its respective outer portion 126 through two corresponding openings in the outer portion and at least one opening in the elbow. Alternatively, the elbow can be welded to, or be formed from, the outer portion 126, or similarly attached. Further, each arm 121 has a casing 132 on a generally upper surface of the outer portion 126, in relation to the tow bar assembly 100 being installed between the towing vehicle V1 and towed vehicle V2, around an opening in the outer portion. A T-pin 130, screw, or similar adjustable fastener engages an upper opening in the casing 132 and the opening in the outer portion of each arm 121 to control or adjust the extension and retraction of the inner portion 128 of each arm relative to the outer portion. The inner portion 128 of the arm 121 pivots and rotates about a central axis within and in relation to the outer portion 126 of the arm, creating a third pivot axis "A3." Each arm 121 pivots about the second pivot member 120 independently of each other arm 121.

Figure 5:
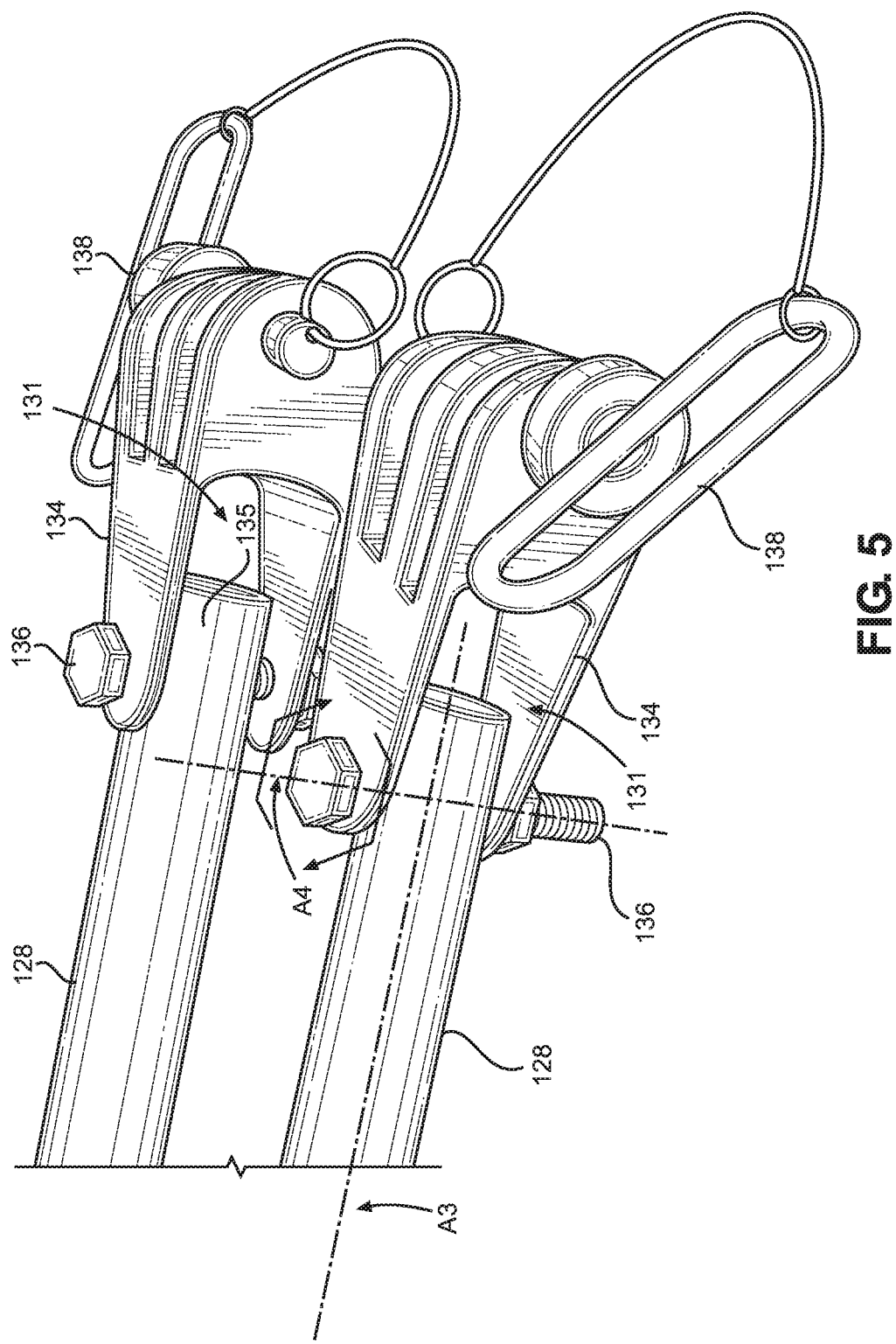
FIG. 5 is a side perspective view of a pair of mounting brackets of the tow bar assembly shown in FIG. 1, further showing pivotal motion between the mounting brackets and tow hitch member arms.

As shown in FIG. 5, a mounting bracket 134 mounted on each arm 121 has a flanged opening 131 is pivotally connected to an end 135 of the inner portion 128 of each arm 121 that extends away from the outer portion 126 via a third pivot member 136. Each mounting bracket pivots relative to each respective arm 121 about the third pivot member 136, and along a fourth pivot axis "A4." A mounting pin 138 slidably engages each mounting bracket and secures each mounting bracket to the towed vehicle V2 once the tow bar assembly has been installed between the towing vehicle V1 and towed vehicle. The mounting bracket 134 can be a clevis or any other known configuration capable of attaching to towed vehicle V2 frames and being capable of pivotal movement with each arm 121.

In other embodiments of the invention, the tow hitch member 103 has only one arm 121, but otherwise has the same structure and function as the tow hitch member of FIG. 1. Specifically, an embodiment of the tow bar assembly 100 wherein the tow hitch member 103 only has one arm includes an arm 121 having an inner portion 128 that is selectively telescopically adjustable to extend from or retract into an outer portion 126 thereof. The outer portion 126 of the arm is pivotally connected to a connector 118 by a second pivot member 120. A mount bracket 134 is pivotally connected by a third pivot member 136 to an end of the inner portion 128 that extends from the outer portion 126 of the arm 121. The inner portion 128 of the arm 121 pivots and rotates about a central axis within and in relation to the outer portion 126 of the arm, creating a third pivot axis "A3." The mounting bracket pivots relative to the arm 121, and vice versa, about the third pivot member 136, and along a fourth pivot axis "A4."

The preferred embodiment of the tow bar assembly shown in FIGS. 1-6 has four unique points of pivotal movement, namely the first pivot axis A1, second pivot axis A2, third pivot axis A3, and fourth pivot axis A4. The first and second pivot axes A1, A2 rotate in directions generally perpendicular to each other. The third pivot axis A3 rotates about an elongated central axis of the inner portion 128 of each arm 121 of the tow hitch member 103. Naturally, each arm, if more than one arm is included, has its own central elongated axis acting as the third pivot axis that each inner portion 128 rotates about. The fourth pivot axis A4 is fixed perpendicularly in relation to the central axis of the each arm 121. Further, the third pivot axis A3 and fourth pivot axis A4 intersect perpendicularly, whereas the first and second pivot axes A1, A2 do not intersect. Each axis A1, A2, A3, and A4 is capable of provide simultaneous pivotal motion among the housing 106, connector 118, tow hitch member 103, and mounting bracket 134, respectively.

The first, second, and third pivot members 116, 120, and 136 serve the dual purpose of securing individual parts of the tow bar assembly 100 together and also serving as axes A1, A2, and A4, respectively, about which parts of the tow bar assembly pivot. As such, the pivot members must be of a quality strong enough to safely secure the tow bar assembly 100 and also provide a suitable surface upon which the assembly can pivot. As such, the pivot members 116, 120, and 136 are typically bolts secured with nuts, wherein the bolts typically have a smooth section and a threaded section. The smooth section of the bolts provide a better pivot surface and less friction, while the threaded section provides a surface for the nuts to attach to the bolt. However, there is no required configuration of surfaces for the pivot members 116, 120, and 136. Any suitable fastener that can achieve the two stated qualities is acceptable. Other components of the tow bar assembly, including the safety break assembly 101, connector 118, tow hitch member 103, and mounting bracket 134 are made from industry-standard components manufactured for the stated desired qualities of strength and safety, which is typically found in an all steel construction. However, other materials that can emulate or improve upon the desirous qualities of steel as used for tow bars may be used for the manufacture of the components specified in this disclosure.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

The invention claimed is:

1. A tow bar assembly for connecting a towing vehicle to a towed vehicle, comprising:
 a drawbar that is receivable within a receiver of a towing vehicle;
 a housing having oppositely oriented first and second ends, wherein the first end of the housing connects the housing to the drawbar and the second end of the housing is defined by a pair of vertically oriented opposing generally parallel and spaced flanges adapted to receive a first pivot member;
 a connector having oppositely oriented first and second ends,
  the first end of the connector oriented between the flanges of the second end of the housing and connected to the second end of the housing via the first pivot member such that the connector and housing are pivotal along a first pivot axis,
  the second end of the connector defined by a pair of horizontally oriented opposing generally parallel and spaced flanges adapted to receive a second pivot member;
 a tow hitch member having at least one arm connected to the second pivot member and extending from the second pivot member to a mounting bracket for connection to the towed vehicle and such that the connector and tow hitch member are pivotal about a second pivot axis, whereby the tow bar assembly permits universal pivoting motion between the towing vehicle and the towed vehicle.

2. The tow bar assembly of claim 1, wherein the at least one arm has an inner portion that is selectively extendable and retractable relative to an outer portion thereof.

3. The tow bar assembly of claim 2, wherein the tow hitch member includes a pair of arms pivotally mounted to the second end of the connector so as to be independently pivotal about the second pivot axis.

4. The tow bar assembly of claim 2, wherein the inner portion of the at least one arm is rotationally pivotal within the outer portion and about a central axis of the inner portion, such that the at least one arm is pivotal about a third pivot axis.

5. The tow bar assembly of claim 4, wherein the mounting bracket is pivotally connected to the at least one arm by a third pivot member, such that the tow hitch assembly and mount bracket are pivotal about a fourth pivot axis.

6. The tow bar assembly of claim 5, wherein the outer portion of the at least one arm has an opening for receiving a fastener.

7. The tow bar assembly of claim 6, wherein the fastener is configured to slidably engage the opening and secure the inner portion in an extended position when extended from the outer portion.

8. The tow bar assembly of claim 2, wherein the at least one arm is pivotally attached to the mounting bracket and is rotationally pivotal about an elongated axis of the arm so as to pivot about two axes that are oriented perpendicularly relative to one another.

9. The tow bar assembly of claim 1, wherein the first pivot member permits rotation about the first pivot axis of up to approximately 180°.

10. The tow bar assembly of claim 1, wherein the second pivot member permits rotation about the second pivot axis of up to approximately 180°.

11. The tow bar assembly of claim 1, further comprising a supplemental breaking system.

12. The tow bar assembly of claim 11, wherein the at least one arm is pivotally attached to the mounting bracket and is rotationally pivotal about an elongated axis of the arm so as to pivot about two axes that are oriented perpendicularly relative to one another.

13. The tow bar assembly of claim 11, wherein the tow hitch member includes a pair of arms pivotally mounted to the second end of the connector so as to be independently pivotal about the second pivot axis.

14. The tow bar assembly of claim 11, wherein each arm has an inner portion that is selectively extendable and retractable relative to an outer portion thereof.

15. The tow bar assembly of claim 14, wherein each outer portion of each arm has an opening for receiving a fastener.

16. The tow bar assembly of claim 15, wherein the fastener is configured to slidably engage the opening and secure the inner portion in an extended position when extended from the outer portion.

17. The tow bar assembly of claim 13, wherein each arm of the pair of arms is pivotally attached to the mounting bracket so as to pivot about two axes that are oriented perpendicularly relative to one another.

18. The tow bar assembly of claim 11, wherein the first pivot member permits rotation about the first pivot axis of up to approximately 180°.

19. The tow bar assembly of claim 11, wherein the second pivot member permits rotation about the second pivot axis of up to approximately 180°.

* * * * *